(12) United States Patent
Nakashizu et al.

(10) Patent No.: US 8,906,222 B2
(45) Date of Patent: Dec. 9, 2014

(54) MANAGEMENT METHOD FOR WAX FRACTION STORAGE TANK

(75) Inventors: Shigenori Nakashizu, Hiki-gun (JP); Yutaka Miyata, Koshigaya (JP); Kazuhito Sato, Kitakatsushika-gun (JP)

(73) Assignees: Japan Oil, Gas and Metals National Corporation, Kanagawa (JP); Inpex Corporation, Tokyo (JP); Nippon Oil Corporation, Tokyo (JP); Japan Petroleum Exploration Co., Ltd., Tokyo (JP); Cosmo Oil Co., Ltd., Tokyo (JP); Nippon Steel Engineering Co., Ltd., Tokyo (JP)

( * ) Notice: Subject to any disclaimer, the term of this patent is extended or adjusted under 35 U.S.C. 154(b) by 123 days.

(21) Appl. No.: 12/735,082

(22) PCT Filed: Dec. 11, 2008

(86) PCT No.: PCT/JP2008/072520
§ 371 (c)(1),
(2), (4) Date: Jun. 14, 2010

(87) PCT Pub. No.: WO2009/078332
PCT Pub. Date: Jun. 25, 2009

(65) Prior Publication Data
US 2010/0282328 A1 Nov. 11, 2010

(30) Foreign Application Priority Data
Dec. 19, 2007 (JP) .................. 2007-326927

(51) Int. Cl.
*C10G 47/00* (2006.01)
*C10G 47/36* (2006.01)
*C10G 73/44* (2006.01)
*C10G 2/00* (2006.01)

(52) U.S. Cl.
CPC *C10G 2/30* (2013.01); *C10G 47/00* (2013.01); *C10G 2/32* (2013.01); *C10G 2300/1022* (2013.01)
USPC ............................ 208/58; 208/20; 585/330

(58) Field of Classification Search
USPC .................... 585/330; 208/20, 58
See application file for complete search history.

(56) References Cited

U.S. PATENT DOCUMENTS

| | | | |
|---|---|---|---|
| 3,669,922 A * | 6/1972 | Bartsch et al. ............ | 524/88 |
| 4,089,880 A * | 5/1978 | Sullivan ............ | 554/176 |
| 5,302,185 A | 4/1994 | Steinleitner | |
| 6,079,461 A * | 6/2000 | Fisher et al. ............ | 141/231 |
| 6,162,956 A | 12/2000 | Berlowitz et al. | |
| 6,822,126 B2 | 11/2004 | Miller | |
| 6,833,484 B2 | 12/2004 | O'Rear | |
| 6,838,487 B1 | 1/2005 | Demirel et al. | |
| 6,878,854 B2 | 4/2005 | O'Rear | |
| 6,897,177 B2 | 5/2005 | Van Berge et al. | |
| 7,303,731 B2 * | 12/2007 | Demirel et al. ............ | 422/223 |
| 2002/0193645 A1 | 12/2002 | O'Rear | |
| 2002/0193646 A1 * | 12/2002 | O'rear ............ | 585/3 |
| 2003/0018087 A1 | 1/2003 | Wittenbrink et al. | |
| 2007/0066690 A1 | 3/2007 | Maretto et al. | |

FOREIGN PATENT DOCUMENTS

| | | |
|---|---|---|
| EG | 20730 A | 12/1999 |
| JP | 2002-523554 | 7/2002 |
| JP | 2004-534881 | 11/2004 |
| JP | 2005-502739 | 1/2005 |
| JP | 2005-510582 | 4/2005 |
| JP | 2007-91983 | 4/2007 |

OTHER PUBLICATIONS

International Search Report dated Mar. 17, 2009 issued in corresponding PCT Application No. PCT/JP2008/072520.
Egyptian Office Action issued in corresponding Egyptian Application No. 1019/2010.
Eurasian Office Action, dated Jul. 30, 2012, issued in corresponding Eurasian application No. 201000917.
Chinese Office Action, dated Aug. 31, 2012, issued in corresponding Chinese application No. 200880121239.7.
Extended European Search Report dated Jan. 8, 2014 issued in corresponding EP Application No. 08 861 676.8.

* cited by examiner

*Primary Examiner* — Eric Keasel
*Assistant Examiner* — Seth W Mackay-Smith
(74) *Attorney, Agent, or Firm* — Kenyon & Kenyon LLP

(57) ABSTRACT

The present invention relates to a management method for a wax fraction storage tank that stores a wax fraction produced by Fischer-Tropsch synthesis until the wax fraction is hydrocracked, the management method including maintaining the temperature inside the tank at 90° C. to 130° C. and maintaining the atmosphere inside the tank to be an inert gas atmosphere.

6 Claims, No Drawings

US 8,906,222 B2

MANAGEMENT METHOD FOR WAX FRACTION STORAGE TANK

TECHNICAL FIELD

This application is a national stage application of International Application No. PCT/JP2008/072520, filed 11 Dec. 2008, which claims priority to Japanese Application No. 2007-326927, filed 19 Dec. 2007, which is incorporated by reference in its entirety.

The present invention relates to a management method for a wax fraction storage tank provided between an FT reactor and a hydrocracking reactor in a GTL (Gas to Liquid) process. More specifically, in order to deal with starting the process, modifying operation conditions thereof or the like, the invention provides a method of suppressing production of a material causing the reduction of activity of a catalyst used in a hydrocracking process by maintaining the atmosphere inside a wax fraction storage tank provided to store a wax fraction as a raw material for hydrocracking to be a certain atmosphere.

BACKGROUND ART

Generally, FT synthesis is carried out to produce hydrocarbons of all states ranging from a gas fraction to a solid fraction by using a carbon monoxide-hydrogen mixture gas (synthesis gas) as a raw material, and the product thereof has normal paraffins as a main component. By the FT synthesis, a clean fuel oil that without a sulfur component, a nitrogen component or an aromatic component can be prepared. The FT product has, as a main component, normal paraffins having a wide carbon number distribution of 1 to about 100. Accordingly, in order to prepare a diesel fuel oil, a middle fraction having a carbon number of about 10 to 21 is subjected to hydroisomerization or a wax fraction having a carbon number of 22 or more which is a solid fraction at a room temperature is hydrocracked to produce a middle fraction, thereby producing the diesel fuel oil. In this manner, generally, the product produced by the FT synthesis is converted into a fuel oil which is clean and which has excellent cold flow properties by way of an upgrading process such as hydroisomerization or hydrocracking.

Between an FT synthesis reactor and a reactor for each upgrading process, a buffer tank for storing a wax fraction or a middle fraction which is obtained in the FT synthesis process and is used as a raw material for the upgrading process is installed to deal with starting the process, modifying operation conditions thereof (e.g. increasing or decreasing the charging amount of raw material), or the occurrence of errors in the process.

The wax fraction in the FT synthesis product has, as a main component, normal paraffins having a carbon number of about 20 to 100, as described above. In addition, the wax fraction is solid and has no flowability at a room temperature. Accordingly, generally, a process line through which the wax fraction flows is a steam tracing line, or tank heating is performed to maintain the flowability.

However, a small amount of impurities such as oxygenated compounds or olefins is contained in the wax fraction although the amount of impurities varies depending on FT reaction conditions and the type of FT catalyst used. For this reason, when the wax fraction is stored in a tank for a certain period of time, a polymeric substance such as a peroxide or gum component may be produced depending on the storage conditions of the wax fraction, and such products may have an influence on activity of a catalyst in the hydrocracking process. Meanwhile, methods or apparatuses for removing the impurities in the wax fraction and a technique of suppressing oxidation of FT products have been studied (for example, Patent documents 1 and 2).

Patent document 1: Published Japanese Translation No. 2005-502739 of the PCT International Application Patent document 2: Published Japanese Translation No. 2004-534881 of the PCT International Application

DISCLOSURE OF THE INVENTION

However, methods or apparatuses for suppressing the production of peroxides and the like in a wax fraction storage tank have not yet been studied. That is, in the prior art, generally, a pressure-adjusting valve and a line are provided in order to release gas components produced in a wax fraction storage tank, which is operated at a lower pressure than an FT reactor, to the outside. However, there are the following problems in such a method. That is, the entry of air from the outside may occur when a liquid level of the wax fraction storage tank fluctuates by modification in operation load. In addition, when the temperature in the wax fraction storage tank is too low, the wax is solidified and flowability thereof cannot be maintained. On the other hand, when the temperature is high, the production of impurities such as peroxides is promoted in the wax fraction in the storage tank together with the above-described entry of air. In such a situation, a correct management method for a wax fraction storage tank, which suppresses production of a substance causing reduction of activity of a catalyst in the tank for storing a wax fraction as a raw material for hydrocracking, is required in order to achieve stable operation of the hydrocracking process without causing a negative influence on the catalyst used in the hydrocracking process.

The present invention was contrived in view of the above-described circumstances. An object of the present invention is to provide a management method for a wax fraction storage tank that stores a raw material for a hydrocracking process, namely a management method that can suppress the production of a substance causing the reduction in activity of the hydrocracking catalyst in the hydrocracking process in which a wax fraction obtained by FT synthesis is used as the raw material, and that can achieve stable operation of the hydrocracking process.

The present inventors have conducted intensive studies to achieve the above-described object. As a result, the present inventors discovered that flowability of a wax fraction can be maintained and the production of a substance such as peroxides causing the reduction in activity of a catalyst can be suppressed by maintaining the temperature and the atmosphere inside a wax fraction storage tank under certain conditions, and this resulted in the present invention. That is, the invention relates to a management method for a wax fraction storage tank, as described below.

According to an aspect of the present invention, there is provided a management method for a wax fraction storage tank that stores a wax fraction produced by Fischer-Tropsch synthesis until the wax fraction is hydrocracked, the management method including maintaining the temperature inside the tank at 90° C. to 130° C., and maintaining the atmosphere inside the tank to be an inert gas atmosphere.

In the aspect of the present invention, the temperature inside the tank is preferably maintained at of 100° C. to 130° C., and more preferably at 105° C. to 130° C.

Moreover, in order to maintain the atmosphere inside the tank to be an inert gas atmosphere, at least one inert gas selected from the group consisting of nitrogen, helium, argon and carbon dioxide is preferably used.

Furthermore, the atmosphere inside the tank is preferably maintained to be a nitrogen or helium atmosphere.

According to the present invention, in the storage tank for the wax fraction as a raw material for the hydrocracking process, production of peroxides and the like causing the reduction in activity of a catalyst in the hydrocracking process can be suppressed. Accordingly, the hydrocracking process can be stably operated.

BEST MODE FOR CARRYING OUT THE INVENTION

Hereinafter, the present invention will be described in detail.

Fischer-Tropsch (hereinafter, referred to as "FT") synthesis is carried out by methods known to those skilled in the art. In such known methods, a catalyst containing a type of metal such as Fe, Co, Ni or Ru, which is active in the FT reaction, is used to produce hydrocarbons from a $H_2$—CO synthesis gas. In general, the reaction temperature is within the range of 200° C. to 400° C. and the reaction pressure is in the range of 0.1 MPa to 4 MPa.

Most products obtained by the FT synthesis are normal paraffins. However, impurities such as olefins or oxygenated compounds (e.g. alcohols, aldehydes, acids, or esters) are contained therein, as well as the normal paraffins. The content of olefins and oxygenated compounds is larger in a middle fraction or lower fractions (e.g. normal paraffins having a carbon number of 5 to 20). Specifically, the content of olefins may reach several percent to tens of percent, and the content of oxygenated compounds may reach several percent although the contents thereof vary with conditions for the FT reaction or the type of FT catalyst used therein. In a wax fraction that includes compounds having a carbon number of 20 or more as a main component, the content of such impurities tends to be small. However, the impurities may be contained at a level of a few percent.

The wax fraction produced by the FT synthesis is converted into a diesel fuel oil having excellent cold flow properties by hydrocracking. Generally, as a catalyst used in hydrocracking of the wax fraction, a catalyst prepared by loading precious metal, or Group VI or Group VIII metal onto a zeolite or inorganic-oxide support is used. Hydrocracking is conducted where the reaction temperature is 200° C. to 400° C., the reaction pressure is 1 MPa to 10 MPa, the $H_2$/Oil ratio is 100 L/L to 1,000 L/L, and LHSV is 0.1 $h^{-1}$ to 3 $h^{-1}$. Examples of the precious metal include Pt, Pd or Rh while examples of the Group VI or Group VIII metal include Mo, Co, or Ni. In addition, examples of the zeolite support include USY, Y, mordenite or β. Examples of the inorganic-oxide support include metal oxides such as silica, alumina, boria, magnesia, titania or complexes thereof; or clay minerals such as montmorillonite, kaolinite or bentonite.

In the process of hydrocracking the wax fraction produced by the FT synthesis reaction, an intermediate tank is provided in a general plant to store the wax fraction which is a raw material for the hydrocracking. The tank is used to accumulate a certain amount of the raw material wax fraction therein, whereby the hydrocracking process can be smoothly started when starting the plant. The tank also has a role to act as a buffer that alleviates fluctuations in the flow rate of the wax fraction generated when the reaction conditions of the FT synthesis process or the hydrocracking process are modified or when troubles are caused.

It is preferable that such the wax fraction storage tank has a sufficient size to alleviate the fluctuations in view of the process scale and the flow rate fluctuation range. In addition, with regard to the shape of the tank, a cylindrical type, a cone roof type, a dome roof type, a floating roof type, a floating roof shape, a spherical shape or the like can be mentioned. However, the shape thereof is not particularly limited.

As described above, since the wax fraction has, as a main component, normal paraffins having a carbon number of 20 or more, the wax fraction is in the solid state, and has no flowability at a room temperature. In general, the melting point of the wax fraction obtained by the FT synthesis is about 70° C. to 100° C. although the melting point varies between the distillate fractions by distillation or with the FT reaction conditions. Sufficient flowability can be ensured in such a temperature range or higher. Accordingly, it is required to heat the process line including the intermediate tank provided between the FT synthesis process and the hydrocracking process to a temperature where the wax fraction exhibits sufficient flowability or higher.

However, if the wax fraction is excessively heated under an oxygen atmosphere, the following phenomenon occurs. That is, in the phenomenon, the above-described olefins and the oxygenated compounds contained in the wax fraction are oxidatively deteriorated whereby the peroxide number increases, and the activity of a catalyst in a hydrocracking reaction, wherein such a wax fraction is used as raw oil, decreases.

In such a state of the art, it was discovered that the reduction of the activity in the hydrocracking process can be suppressed by controlling the heating temperature in storage of the wax fraction and maintaining an inert gas atmosphere.

The temperature inside the wax fraction storage tank is maintained at 90° C. to 130° C., preferably at 100° C. to 130° C., and more preferably at 105° C. to 130° C. When the storage temperature is lower than 90° C., flowability of the wax fraction deteriorates. Consequently, defects such as pipe clogging caused by solidification may be generated. Therefore, it is preferable that the temperature inside the wax fraction storage tank be maintained at 90° C. or more. On the other hand, production of peroxide and the like is suppressed by maintaining the storage temperature at 130° C. or less. As a result, the wax fraction can be prevented from being oxidatively deteriorated.

Heating by steam tracing or heating by electric tracing or a burner can be performed to maintain the temperature in the storage tank. However, heating by steam tracing is general. Steam tracing is preferably performed since steam tracing is safe and secure in a process of treating a combustible material and the heating temperature can be easily modified by adjusting a steam pressure.

Furthermore, the atmosphere inside the storage tank is maintained to be an inert gas atmosphere. The inert gas atmosphere refers to an atmosphere in which oxygen does not generally exist. The purge rate by the inert gas is 95% or higher, preferably 98% or higher, and more preferably 99% or higher.

Moreover, the inert gas purging is performed to substitute, with the inert gas, oxygen present in a gas-phase area inside the tank wherein the wax fraction is stored while being heated. The inert gas purging can be performed by directly spraying the inert gas to the gas-phase area. In this case, the flow rate or pressure of the purge gas is controlled so as to fulfill a pressure range allowable to the shape or design of the tank.

Examples of the inert gas include nitrogen, helium, argon and carbon dioxide. The inert gas is not particularly limited as long as the inert gas can control the oxidative deterioration of the wax fraction. These may be used singularly or in combination of two or more types. However, a nitrogen or helium gas is preferably used in terms of effective suppression of the oxidative deterioration of the wax fraction. Particularly, when the atmosphere inside the storage tank is maintained to be a nitrogen or helium atmosphere, oxidative deterioration of the wax fraction can be effectively prevented. Furthermore, nitrogen is most preferably used since it is used as the inert gas in general plants and is most suitable in view of cost.

EXAMPLES

Hereinafter, the present invention will be described in detail with reference to examples and comparative examples. However, the present invention is not limited to the following examples.

Examples 1 to 2, Comparative Examples 1 to 3

The composition, the density, the melting point, and the peroxide number of a Fischer-Tropsch wax fraction (abbreviated as WAX-a) are shown in Table 1. The wax fraction was rarely molten even when being heated to 80° C., and the flowability thereof could not be retained at 80° C. or less.

Example 1

100 g of the WAX-a was added to a 500 ml beaker, and then purged in a nitrogen stream (100 ml/min) while being heated and stirred in a magnetic stirrer for 3 hours at 110° C. (WAX-b was prepared). The peroxide number after the process is shown in Table 2.

Comparative Example 1

A wax fraction (WAX-d) was obtained in the same manner as in Example 1 except that a WAX-a was treated at 150° C. in air without any particular purging. The peroxide number of WAX-d is shown in Table 2.

Comparative Example 2

A wax fraction (WAX-e) was obtained in the same manner as in Example 1 except that WAX-a was treated at 130° C. in air without any particular purging. The peroxide number of WAX-e is shown in Table 2.

Comparative Example 3

The same treatment as in Example 1 was carried out except that WAX-a was treated at 150° C. in a nitrogen stream. The peroxide number of a wax fraction (WAX-f) is shown in Table 2.

TABLE 1

| Properties of Fischer-Tropsch Wax Fraction | | |
|---|---|---|
| Composition | Normal Paraffin having Carbon Number of 21 or less (mass %) | 31.1 |
| | Normal Paraffin having Carbon Number of 22 or more (mass %) | 62.8 |
| Density at 100° C. (g/cm$^3$) | | 0.729 |
| Melting Point (° C.) | | 88 |
| Peroxide Number (ppm) | | 510 |

TABLE 2

| | | Peroxide Number of Wax Fraction | | | | |
|---|---|---|---|---|---|---|
| | WAX-a | Example 1 WAX-b | Example 2 WAX-c | Comparative Example 1 WAX-d | Comparative Example 2 WAX-e | Comparative Example 3 WAX-f |
| Wax Fraction Temperature (° C.) | — | 110 | 130 | 150 | 130 | 150 |
| Atmosphere in Beaker | — | Nitrogen | Helium | Air | Air | Nitrogen |
| Peroxide Number (ppm) | 510 | 515 | 530 | 1540 | 820 | 752 |

The peroxide number was obtained based on "Test Method for Peroxide Number of Kerosene" of standards of Japan Petroleum Institute and ASTM D1832 "Test Method for Peroxide Number of Petroleum Wax". The measuring method is schematically described as follows. Toluene was added to a sample, and this was heated to 60-65° C. to dissolve it. An acetic acid solution was added to the sample, and then a potassium iodide solution was added with the supply of a nitrogen gas, and stirred. After an indicator was added, titration was carried out with a sodium thiosulfate standard solution to obtain the peroxide number (hereinafter, obtained in the same manner).

Example 2

A wax fraction (WAX-c) was obtained in the same manner as in Example 1 except that WAX-a is treated at 130° C. in a helium stream. The peroxide number of WAX-c is shown in Table 2.

Based on results shown in Table 2, when the wax fraction was stored by the method of Example 1 or 2, the peroxide numbers of the wax fraction after storage had little change in comparison with the value before the storage (i.e. WAX-a). On the other hand, in Comparative Examples 1 to 3, the values of the peroxide numbers increased in comparison with the peroxide number before storage (WAX-a). Particularly, in Comparative Example 1 in which the heating temperature was high, a remarkable increase was shown.

Example 3, Comparative Examples 4 to 6

Next, hydrocracking of wax fractions was carried out.
With regard to an evaluation method for the hydrocracking treatment, "a reaction temperature required for the decomposition rate of the wax fraction to exhibit 50% in the hydrocracking reaction" was set as an index. Generally, the lower a reaction temperature where the same decomposition rate can be obtained in the hydrocracking reaction, the higher the catalyst activity. On the other hand, when the reaction temperature is too high, excessive decomposition of a decomposition product proceeds. Eventually, this would be a factor that lowers yield of an objective middle fraction. Furthermore, generally, reduction in the catalyst activity in long-term operation of the hydrocracking reaction is compensated by adjusting the reaction temperature. For the above-described reasons, the lower the initial reaction temperature, the larger a margin of the temperature compensation. Since such a lower initial temperature results in improvement of catalyst life and cost reduction in the catalyst exchange, such a lower initial temperature is preferable.

Herein, the decomposition rate of the wax fraction is defined as follows where "A" refers to a fraction ratio (mass %) having a carbon number of 22 or more in the raw wax fraction, and "B" refers to a fraction ratio (mass %) having carbon number of 22 or more in the product.

Decomposition Rate (%) of Wax Fraction=(A−B)/A×100

The fraction ratio A (mass %) having a carbon number of 22 or more in the raw wax fraction was obtained by conducting gas chromatography analysis with respect to the raw wax fraction.

In order to obtain the fraction ratio B (mass %) having a carbon number of 22 or more in the product, a liquid product in the product after decomposition reaction was recovered into a high-pressure gas-liquid separator and a cold trap while a gaseous product therein was collected into a sampling bag. These products were then analyzed based on gas chromatography analysis.

The decomposition rate (%) of the wax fraction was calculated as described above. The reaction temperature where the value was 50% was determined, and set as an evaluation index.

Example 3

The temperature of a raw oil tank (20 L) was maintained at 110° C. so as to treat WAX-a at the same heating temperature and in the same atmosphere as in Example 1. The nitrogen-purged wax fraction as raw oil was hydrocracked using a platinum group-based catalyst containing 0.5 mass % of platinum, based on the catalyst basis and the metal equivalent, in a USY zeolite support (Si/Al≅3 mol/mol) under conditions of a reaction pressure of 3.0 MPa; LHSV of 1 h$^{-1}$; and H$_2$/Oil of 587 L/L. Herein, the raw wax fraction was supplied to the top of a fixed-bed flow-type reactor with down flow. The reaction tube had an inner diameter of 23 mm, and was filled with 150 ml of the catalyst. In addition, prior to the decomposition reaction, a catalytic reduction treatment was carried out for 2 hours at 300° C. in a hydrogen stream. The results are shown in Table 3. The reaction temperature required for the decomposition rate of the wax fraction to exhibit 50% was about 245° C.

Comparative Example 4

The same evaluation as in Example 3 was carried out, except that the temperature of the raw oil tank was maintained at 150° C. so as to treat WAX-a at the same heating temperature and in the same atmosphere as in Comparative Example 1 and that the wax fraction without any particular purging was used as a raw oil. The results are shown in Table 3. The reaction temperature required for the decomposition rate of the wax fraction to exhibit 50% was about 288° C.

Comparative Example 5

The same evaluation as in Example 3 was carried out, except that the temperature of the raw oil tank was maintained at 130° C. so as to treat WAX-a at the same heating temperature and in the same atmosphere as in Comparative Example 2 and that the wax fraction without any particular purging was used as a raw oil. The results are shown in Table 3. The reaction temperature required for the decomposition rate of the wax fraction to exhibit 50% was about 267° C.

Comparative Example 6

The same evaluation as in Example 3 was carried out, except that the temperature of the raw oil tank was maintained at 150° C. so as to treat WAX-a at the same heating temperature and in the same atmosphere as in Comparative Example 3. The results are shown in Table 3. The reaction temperature required for the decomposition rate of the wax fraction to exhibit 50% was about 266° C.

TABLE 3

Results of Hydrocracking

|  | Example 3 | Comparative Example 4 | Comparative Example 5 | Comparative Example 6 |
|---|---|---|---|---|
| Temperature inside Tank (° C.) | 110 | 150 | 130 | 150 |
| Atmosphere inside Tank | Nitrogen | Air | Air | Nitrogen |
| Reaction Temperature (° C.) (where the wax decomposition rate was 50%) | 245 | 288 | 267 | 266 |

Based on the above results, it is obvious that production of peroxide caused by the oxidative deterioration can be suppressed by maintaining the wax fraction at a proper temperature and maintaining the inert gas atmosphere. It is believed that the peroxide in the wax fraction is a cause for reduction in activity of a catalyst in the hydrocracking process, and it was discovered that activity of a catalyst in the hydrocracking is maintained at a high level by performing proper management in the wax fraction storage method according to the present invention.

INDUSTRIAL APPLICABILITY

The present invention relates to a management method for a wax fraction storage tank provided between an FT reactor and a hydrocracking reactor in a GTL (Gas to Liquids) process, and enables stable operation of the hydrocracking process. Accordingly, the present invention has high industrial applicability in industrial fields such as GTL (Gas to Liquid), petroleum refining and the like.

The invention claimed is:
1. A method comprising:
producing a wax fraction by Fischer-Tropsch synthesis;
then storing a fraction consisting of the wax fraction produced by Fischer-Tropsch synthesis prior to hydrocracking the wax fraction in a tank;
maintaining a temperature inside the tank in the range of 90° C. to 130° C. and maintaining an inert gas atmosphere inside the tank while the wax fraction produced by Fischer-Tropsch synthesis is stored in the tank and suppressing the production of peroxides in the wax fraction prior to hydrocracking the wax fraction;

then hydrocracking the fraction consisting of the wax fraction produced by Fischer-Tropsch synthesis to convert the wax fraction into diesel fuel oil.

2. The method according to claim 1, wherein the temperature inside the tank is in the range of 100° C. to 130° C.

3. The method according to claim 1, wherein the temperature inside the tank is in the range of 105° C. to 130° C.

4. The method according to claim 1, wherein the inert gas atmosphere inside the tank is maintained using at least one inert gas selected from the group consisting of nitrogen, helium, argon and carbon dioxide.

5. The method according to claim 1, wherein the inert gas atmosphere inside the tank is a nitrogen atmosphere.

6. The method according to claim 1, wherein the inert gas atmosphere inside the tank is a helium atmosphere.

* * * * *